United States Patent
O'Brien

(10) Patent No.: US 10,611,579 B2
(45) Date of Patent: Apr. 7, 2020

(54) END PLUG FOR FLOOR SLAT

(71) Applicant: Keith Manufacturing Co., Madras, OR (US)

(72) Inventor: Brandon O'Brien, Madras, OR (US)

(73) Assignee: Keith Manufacturing Co., Madras, OR (US)

( * ) Notice: Subject to any disclaimer, the term of this patent is extended or adjusted under 35 U.S.C. 154(b) by 0 days.

(21) Appl. No.: 16/502,240

(22) Filed: Jul. 3, 2019

(65) Prior Publication Data

US 2020/0010279 A1    Jan. 9, 2020

Related U.S. Application Data

(60) Provisional application No. 62/694,098, filed on Jul. 5, 2018.

(51) Int. Cl.
*B65G 25/06* (2006.01)

(52) U.S. Cl.
CPC .................... *B65G 25/065* (2013.01)

(58) Field of Classification Search
CPC ....... B65G 25/04; B65G 25/06; B65G 25/065
USPC .......................................... 198/750.2–750.6
See application file for complete search history.

(56) References Cited

U.S. PATENT DOCUMENTS

| | | | | |
|---|---|---|---|---|
| 6,006,895 A * | 12/1999 | Foster | .................. | B65G 25/065 198/750.2 |
| 7,926,646 B1 * | 4/2011 | Berthelsen | ........... | B65G 25/065 198/750.3 |
| 2006/0260463 A1 * | 11/2006 | Wegkamp | ............ | B65G 25/065 92/88 |
| 2007/0261940 A1 * | 11/2007 | Foster | ................... | B65G 25/02 198/750.5 |
| 2008/0264764 A1 * | 10/2008 | Wegkamp | ............ | B65G 25/065 198/750.2 |
| 2009/0107807 A1 * | 4/2009 | Wegkamp | ............ | B65G 25/065 198/750.4 |
| 2010/0025196 A1 * | 2/2010 | Drago | .................. | B65G 25/065 198/750.4 |
| 2013/0186733 A1 * | 7/2013 | Berthelsen | ........... | B65G 25/065 198/750.3 |

* cited by examiner

*Primary Examiner* — Mark A Deuble
(74) *Attorney, Agent, or Firm* — Bruce A. Kaser

(57) ABSTRACT

The present disclosure relates to end caps for extruded floor slats that are built into moving floor conveyor systems. The end cap has a portion that is inserted in the hollow end of an extrusion and is held in place by self-threading screws that thread directly into the material making up the end cap and the floor slat at the same time.

3 Claims, 3 Drawing Sheets

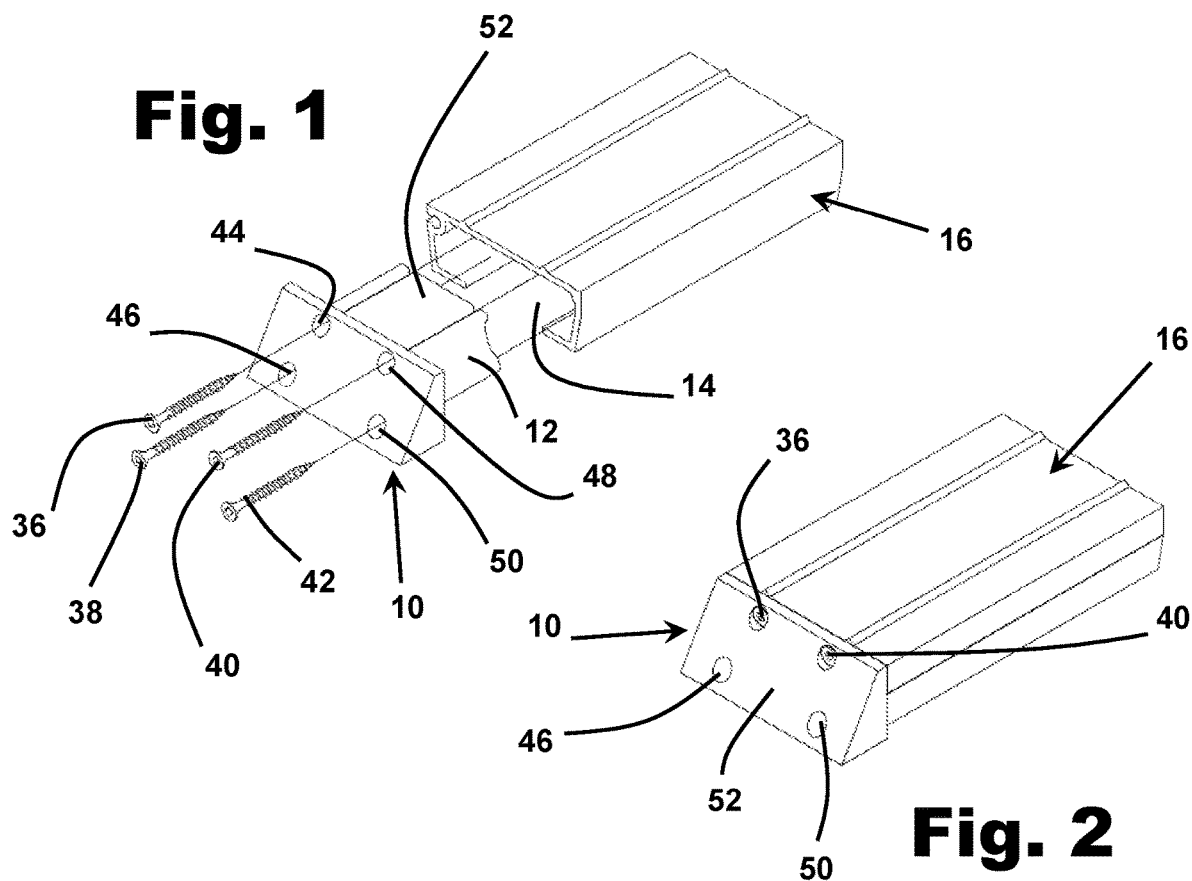
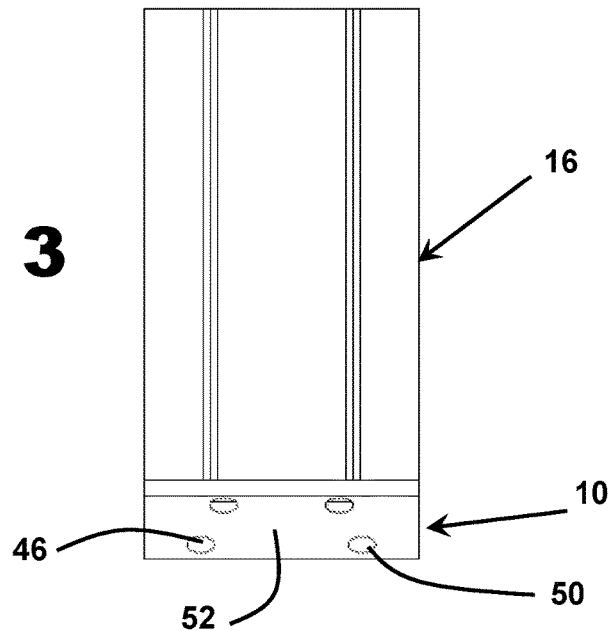

END PLUG FOR FLOOR SLAT

TECHNICAL FIELD

This disclosure relates to reciprocating floor slats that are used in "moving floor" conveyor systems, and more particularly, to end caps for extruded floor slats.

BACKGROUND

Moving floor systems are conveyors that consist of an array of side-by-side floor slats that reciprocate back-and-forth. Typically, all of the slats move in one direction at the same time while carrying a load. Then, a lesser number of slats (usually one third) are moved in the opposite direction back underneath the load. This is repeated sequentially until all of the slats have been returned to the initial position, with the lesser number of slats sliding underneath the load, because they have a smaller area of frictional contact with the load.

Conveyors of the above type are well-known. The floor slats are usually made from aluminum extrusions although, in some cases, they may be made from roll-formed steel.

Typically, a slat will have a hollow cross-section. At the end of the conveyor, it is not desirable to leave slat cross-sections open. For example, in those cases where a moving floor is used to unload bulk materials like sawdust or silage, it is not desirable to allow these materials to enter the ends of the floor slats as the material off-loads from one end of the conveyor.

For this reason, end caps or end plugs (or "plugs") are usually inserted into the ends of the conveyor floor slats in order to close them off. These plugs are fastened to the floor slat by bolts or by welding, which can require skilled labor. Because of labor issues, there has been a need to develop a simpler way to connect the end plugs to the floor slats.

The following discloses an improved end plug design that is easy to attach to a floor slat.

SUMMARY

The design disclosed here is a self-threading end cap design. The end cap has a body portion that is made of a material that is shaped to be inserted into a hollow cavity in an outer end of a floor slat. The floor slat could be made of extruded aluminum, for example, while the end cap body portion could be made of a softer plastic material. In any event, the floor slat has at least one substantially smooth and flat inner surface that is adjacent to the body portion of the end plug.

The body portion of the end plug has at least one partial bore that abuts against the above-described inner surface of the floor slat. The partial bore is sized such that an elongated screw can be partially threaded into the material that makes up the bore and partially into the material that makes up the inner surface of the floor slat at the same time, to hold the end plug in place with respect to the floor slat.

The end plug includes an outer face with at least one screw opening, for insertion of the elongated screw. The screw is self-threaded into the partial bore material and the inner surface material at the same time. This arrangement may be multiplied for several screws in order to secure the end cap in place. The following description of an embodiment describes and illustrates a four-screw connection.

The screw most likely should be a steel screw. The end plug body portion most likely should be made of a plastic material (UMHW or the like). The inner surface of the floor slat most likely should be aluminum, because the floor slat will be extruded from that material. However, these material differences should not necessarily limit the scope of the patent right.

BRIEF DESCRIPTION OF THE DRAWINGS

The following is a brief description of the drawings that accompany this disclosure:

FIG. 1 is a pictorial view of an end portion of an extruded aluminum floor slat with the end plug exploded from the end of the slat;

FIG. 2 is a pictorial view like FIG. 1, but shows the end plug installed in the end of the slat;

FIG. 3 is a top view of the slat and end plug configuration illustrated in FIGS. 1 and 2;

DETAILED DESCRIPTION

Figure 4:
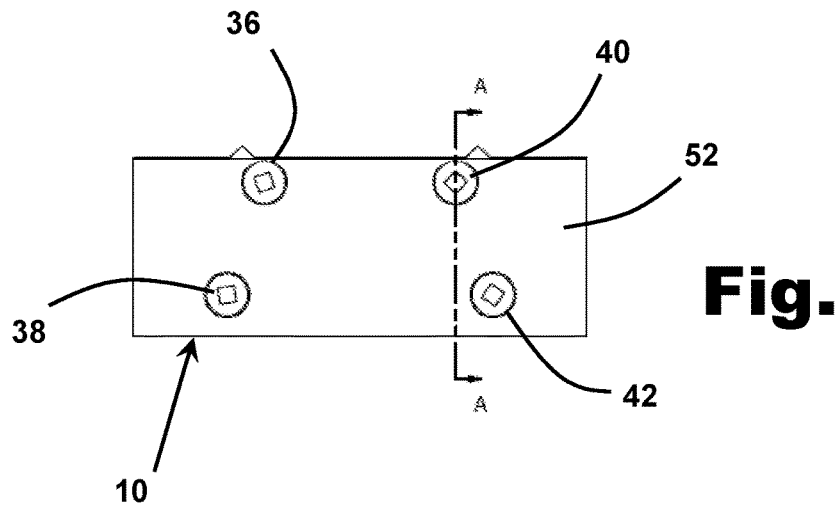
FIG. 4 is an end view of the slat and end plug configuration illustrated in FIGS. 1-3.

Referring now to FIG. 1, reference numeral 10 generally points to an end plug that is designed in accordance with the present disclosure. At the present time, it is anticipated the end plug can be made from UHMW plastic, although it is possible other materials could be made to work.

The end plug 10 has a body portion 12 that is inserted into a hollow cavity (indicated generally by reference numeral 14) in one end of a floor slat 16. As indicated above, the floor slat 16 is probably an aluminum extrusion. The drawings in this disclosure illustrate the floor slat 16 as an aluminum extrusion with a well-known cross-sectional profile.

Figure 7:
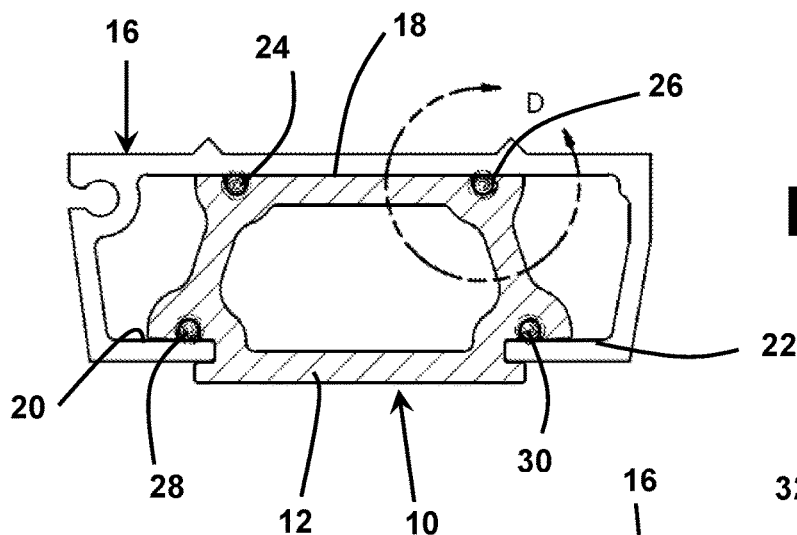
FIG. 7 is an end cross-sectional view of the slat and end plug configuration illustrated in FIGS. 1-6.

Referring to FIG. 7, the slat 16 has a substantially smooth and flat inner surface 18, at the top, and smooth and flat inner surfaces 20, 22 at the bottom. The body portion 12 of the end plug 10 has partial grooves or bores, two of which 24, 26 abut against the upper slat surface 18; and another two 28, 30 abut against the lower inner surfaces 20, 22.

Figure 8:
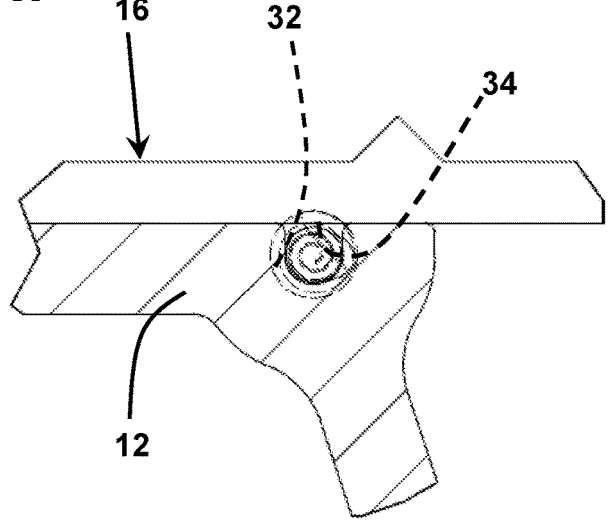
FIG. 8 is an enlargement of a portion of FIG. 7 illustrated at "D" in FIG. 7.
Figure 9:
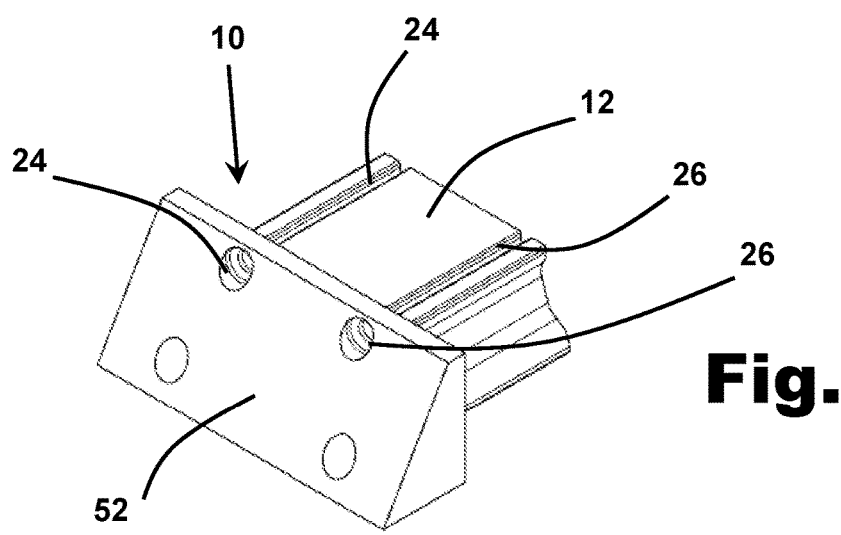
FIG. 9 is a pictorial view of the end plug, standing alone.

Referring now to FIG. 8, the partial grooves or bores 24, 26, 28, 30 just described are sized such that a steel screw can thread into the material that makes up the end plug body 12, on one side (see reference number 32 in FIG. 8) and into the material that makes up the slat 16 on the other side (see reference number 34 in FIG. 8).

In other words, and referring back to FIG. 1, the end plug 10 is held in place in the slat 16 by four screws 36, 38, 40, 42. The screws 36, 38, 40, 42 are inserted through openings 44, 46, 48, 50 in the outer face 52 of the end plug 10. The threaded portions of the screws 36, 38, 40, 42 are essentially self-threaded into the softer material making up the bores 24, 26, 28, 30, in the end plug body 12, on one side of each screw, as just described, and the inner sidewalls 18, 20, 22 of the floor slat 16, on the other side of each screw. If the floor slat 16 is made of extruded aluminum, for example, the threads of a harder steel screw can be turned directly into the aluminum, thus gripping it and the plastic material making up the end plug 12, at the same time. This is illustrated in FIG. 5 at 52 and 54, respectively.

Figure 5:
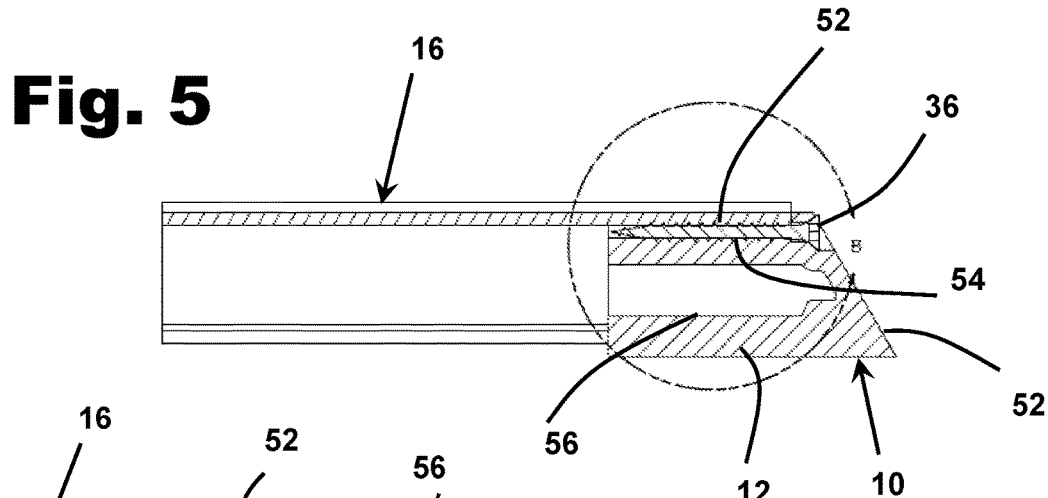
FIG. 5 is a cross-sectional view of the slat and end plug configuration illustrated in FIGS. 1-4, taken along line A-A in FIG. 4.
Figure 6:
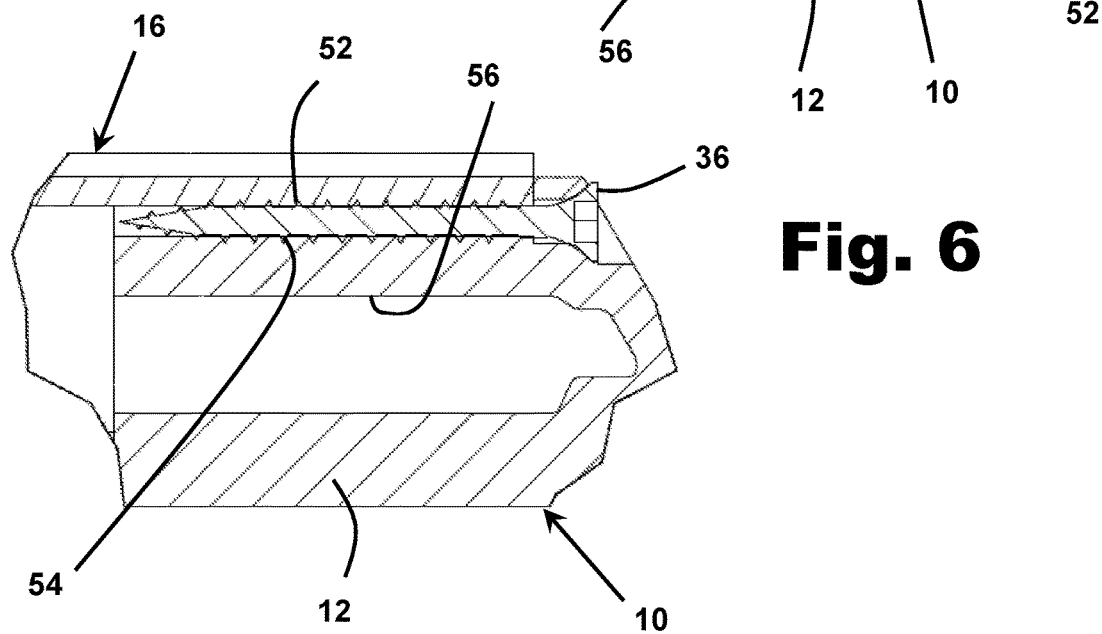
FIG. 6 is an enlargement of the right-hand side of the slat and end plug configuration illustrated at "B" in FIG. 5.

As is also illustrated in FIGS. 5 and 6, the end plug body 12 is hollow, as indicated by reference number 56.

An advantage to the above design is that the end plug 10 is easy to manufacture, and the screw installation, just described, can be implemented by low skill labor.

As the design is developed further, it may be discovered that other materials besides UHMW are suitable for use as the end plug 10; and that the design may work with non-aluminum floor slats.

The foregoing description is not intended to be taken in the limiting sense. The scope of patent protection is to be limited by the patent claim or claims that follow, the interpretation of which is to be made in accordance with the standard doctrines of patent claim interpretation.

What is claimed is:

1. For use in connection with a moving floor conveyor system, an end plug for a reciprocating floor slat, comprising:
    a body portion of said end plug being made of a material that is shaped to be inserted into a hollow cavity in an end of said reciprocating floor slat, said floor slat being made of another material having at least one substantially smooth and flat inner surface adjacent to said body portion of said end plug, with said body portion of said end plug having at least one partial bore that abuts against said smooth and flat inner surface, said partial bore being sized such that an elongated screw can be partially threaded into said material that makes up said bore and partially threaded into said material that makes up said inner surface of said floor slat, to hold said end plug in place with respect to said floor slat.

2. The end plug for a reciprocating floor slat of claim 1, wherein said end plug includes an outer face with at least one screw opening, for insertion of said elongated screw, and to enable said screw to be self-threaded into said partial bore material and said inner surface material at the same time.

3. The end plug for a reciprocating floor slat of claim 1, wherein said screw is a steel screw, said end plug body portion is made of a plastic material, and said inner surface is made of an aluminum material, with said plastic material being softer than said aluminum material.

\* \* \* \* \*